No. 699,560. Patented May 6, 1902.
M. W. PALMER.
BEET HARVESTER.
(Application filed Sept. 20, 1901.)
(No Model.)
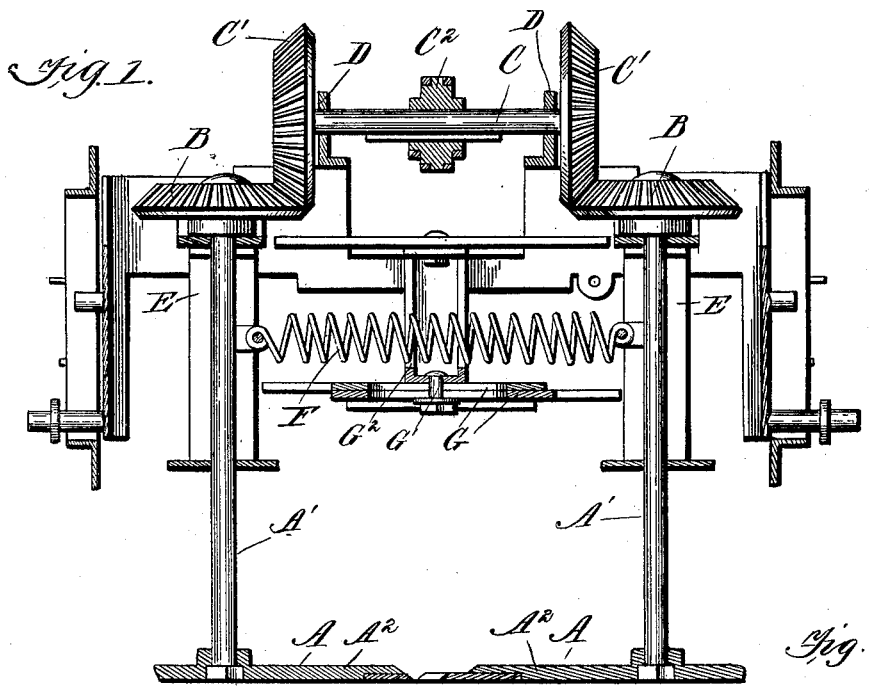
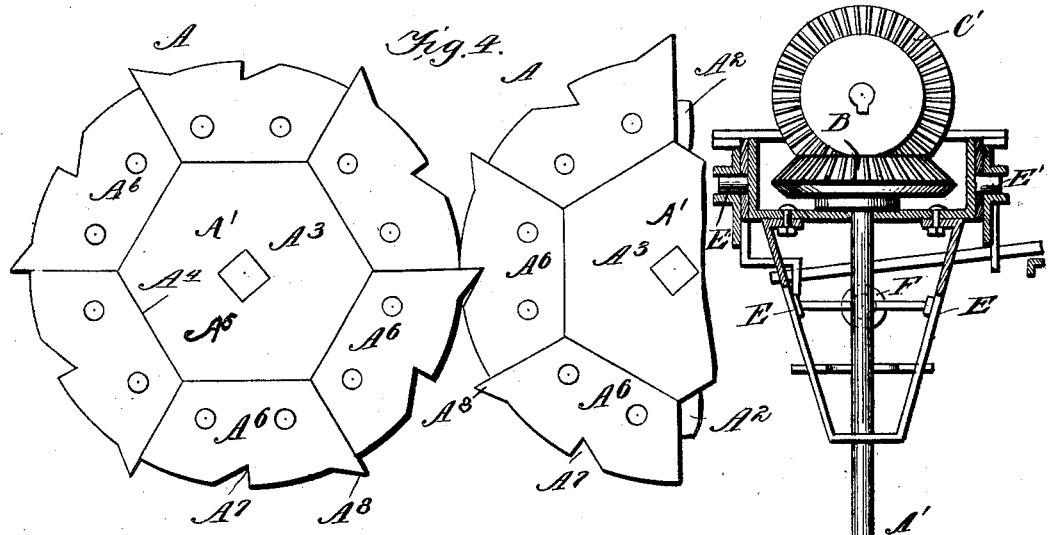
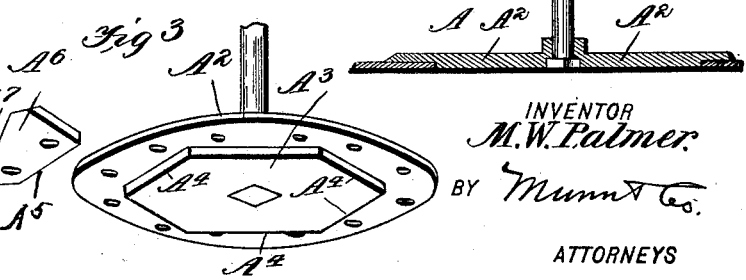
WITNESSES:
Fred D. Bradford
Perry B. Turpin
INVENTOR
M. W. Palmer
BY Munn & Co.
ATTORNEYS

UNITED STATES PATENT OFFICE.

MERRITT W. PALMER, OF HAMILTON, MICHIGAN, ASSIGNOR OF ONE-FOURTH TO RICHARD N. DE MERELL, OF HOLLAND, MICHIGAN.

BEET-HARVESTER.

SPECIFICATION forming part of Letters Patent No. 699,560, dated May 6, 1902.

Original application filed March 6, 1901, Serial No. 50,051. Divided and this application filed September 20, 1901. Serial No. 75,671. (No model.)

*To all whom it may concern:*

Be it known that I, MERRITT W. PALMER, a citizen of the United States, residing at Hamilton, in the county of Allegan and State of Michigan, have made certain new and useful Improvements in Beet-Harvesters, of which the following is a specification.

My invention is an improvement in beet-harvesters, and relates particularly to the means for cutting off the tops of the beets; and the invention consists in certain novel constructions and combinations of parts, as will be hereinafter described.

In the drawings, Figure 1 is a cross-sectional view of a beet-harvester embodying my invention. Fig. 2 is a partial vertical longitudinal section thereof. Fig. 3 is a detail perspective view showing the body portion of one of the cutter-heads and one of the sickles or blades detached therefrom, and Fig. 4 is a bottom plan view of the two cutter-heads.

The present application is a division of the application, Serial No. 50,051, for patent for beet-harvesters, filed March 6, 1901. I do not herein show the framing, except so far as the same serves to support the cutters and the operating means therefor.

The cutters A are carried on the lower ends of the shafts $A'$ and are alike, except they are made rights and lefts, and are constructed, as shown in Figs. 3 and 4, with a body portion or head $A^2$, which is provided on its under side at its center with a projecting portion $A^3$, which provides at $A^4$ a shoulder, against which the inner edges $A^5$ of the sickle or blade sections $A^6$ abut in the application of the blades. When thus fitted together, as shown in Fig. 2, the blade-sections or sickles may be firmly secured in place by rivets or otherwise, as desired. The outer edges of the sections $A^6$ are sharpened, and at such edges I provide each sickle or blade with a notch $A^7$ and with a projection or tooth $A^8$, the opposing cutters being so arranged that the projections or teeth $A^8$ on one blade enter the notches $A^7$ of the other blade, as is best shown in Fig. 4. The shafts $A'$ are provided at their upper ends with beveled pinions B, which are meshed by pinions $C'$ on the ends of the shaft C, which is journaled in bearings D on the cutter-frame and suitably driven. It may be by drive devices operating upon the sprocket-wheel $C^2$, keyed on the said shaft, as shown in Fig. 1. The shafts $A'$ are journaled below their beveled pinions in brackets E, which are pivoted at $E'$ at their upper ends, so their lower ends can adjust toward and from each other to permit the cutters to move together or apart, the opposite brackets being connected by a spring F, which tends to draw them toward each other, and yet permits them to adjust to permit the passage between the cutters of stones or other unyielding obstructions. I also provide between the brackets a stop consisting of sections G G, slotted at their inner ends and adjustably supported at such ends by means of a bolt $G'$, carried by a yoke $G^2$, supported from the framing. By this means the inward movement of the brackets may be limited, and such brackets may be stopped in any desired position.

It will be noticed from the foregoing that I provide spring devices for drawing the brackets toward each other and stop devices for limiting such movement, as may be desired, to limit the inward movement of the cutters toward each other and yet permit the said cutters to move apart for the passage of unyielding obstructions.

As best shown in Fig. 4, the cutter-blades when applied to the body portion abut squarely at their inner edges against the shoulders $A^4$ and squarely at their ends against the adjacent cutters, thus forming a complete circle of cutter-blades, which are braced against inward movement by the shoulders $A'$ and against movement in a circumferential direction by each other, producing a simple, strong, and efficient construction in which any one or more of the blades can be replaced whenever desired without interfering with the others.

Having thus described my invention, what I claim as new, and desire to secure by Letters Patent, is—

1. In a beet-harvester, the combination of the opposing cutters composed each of a body portion provided on its under side with a central projection forming outwardly-facing shoulders, and plate-sections abutting at their inner edges against said shoulders, and secured to the body portion and provided at their outer edges each with a notch and with a projecting tooth portion, the teeth of each cutter being arranged to enter the notches of the opposing cutter in the operation of the device, substantially as set forth.

2. In a beet-harvester, the cutter, substantially as described, comprising a body portion and a circumferential series of plate-sections secured thereto and provided each in its cutting edge with a notch and having at such edge a projecting tooth spaced apart from the adjacent notches by an intervening cutting portion, substantially as set forth.

3. In a beet-harvester, a circular cutter-head having its periphery formed with notches and with projections conforming to said notches whereby the projections of one cutter may enter the notches of a matching cutter and having cutting edges between the adjacent notches and projections.

4. The combination of the opposing cutters provided each in its cutting edge with notches and having on such edge projecting teeth to enter the notches of the opposing cutter, shafts supporting said cutters, means for operating such shafts, supports for said shafts, and means whereby the cutters may be held yieldingly together, substantially as set forth.

5. In a beet-harvester, the combination of the main frame, the cutters having upright shafts, brackets having bearings for such shafts and pivoted at their upper ends, a spring connecting such brackets below said pivots, and stop devices operating between the opposite brackets and adjustable, substantially as set forth.

6. The combination substantially as described, of the framing, the cutter-heads having upright shafts, the brackets having bearings for such shafts and pivotally supported at their upper ends from the framing, and stop devices between the opposite brackets consisting of bars arranged at their outer ends for abutment by the brackets, and fastening means at the inner ends of said bars, substantially as set forth.

MERRITT W. PALMER.

Witnesses:
G. T. NEVENZEL,
JAN NEVENZEL.